US005495256A

United States Patent [19]
Piper

[11] Patent Number: 5,495,256
[45] Date of Patent: Feb. 27, 1996

[54] METHOD OF EFFICIENTLY COMPUTING MAXIMUM LIKELIHOOD BEARING ESTIMATOR

[76] Inventor: John E. Piper, 157 Boca Lagoon Dr., Panama City Beach, Fla. 2408-5101

[21] Appl. No.: 206,432

[22] Filed: Mar. 7, 1994

[51] Int. Cl.$^6$ .................................................. G01S 13/00
[52] U.S. Cl. ........................... 342/195; 342/192; 342/378
[58] Field of Search .............................. 342/357, 13, 126, 342/147, 378, 195, 192

[56] References Cited

U.S. PATENT DOCUMENTS

| H374 | 11/1987 | Abo-Zena et al. | 342/378 |
|---|---|---|---|
| 4,739,329 | 4/1988 | Ward et al. | 342/119 |
| 4,806,936 | 2/1989 | Williams et al. | 342/126 |
| 4,965,732 | 10/1990 | Roy, III et al. | 364/460 |
| 5,165,051 | 11/1992 | Kumar | 327/79 D |
| 5,296,861 | 3/1994 | Knight | 342/357 |

OTHER PUBLICATIONS

Wu, Qiang and Daniel R. Fuhrmann, *A Parametric Method of Determining the Numbers of Signals in Narrow–Band Direction Finding*, IEEE Transactions on Signal Processing, vol. 39, No. 8, Aug. 1991.

Ziskind, Ilan and Mati Wax, *Maximum Likelihood Localization of Multiple Sources by Alternating Projection*, IEEE Transaction on Acoustics, Speech and Signal Processing, vol. 36, No. 10, Oct. 1988.

Abo–Zena, Anas and Eugene L. Church, Optimum Multiple Target direction and Resolution, Statutory Invention Registration H374, Nov. 3, 1987.

*Primary Examiner*—Mark Hellner
*Attorney, Agent, or Firm*—Carnes, Cona, and Dixon

[57] ABSTRACT

The maximum likelihood function can be simplified by exploiting the symmetry in the equations. This new representation leads to a very significant decrease in the computational load for bearing estimation and spectral analysis applications.

3 Claims, 2 Drawing Sheets

METHOD OF EFFICIENTLY COMPUTING MAXIMUM LIKELIHOOD BEARING ESTIMATOR

BACKGROUND OF THE INVENTION

Bearing estimation is an important topic in sonar and radar applications. Historically, bearing estimation has been performed by a process called beamforming. The conventional beamformer adds delays to the outputs of sensors along an array. The summation of these signals produces a beam steered in a direction determined by the delay intervals. The angular resolution of this method is given by the wavelength to aperture ratio. This is known as the Rayleigh limit.

Many techniques have been used to increase the resolution of the bearing estimation problem. The most promising technique is the maximum likelihood method. This technique has been shown to approach the theoretical limit of resolution (Cramer-Rao bound). It is a robust method that works well even with low signal to noise ratios.

The maximum likelihood method fits the data to a model. Typical applications use a least squares metric to calculate the likelihood function. A search based on finding the most likely model parameters results in the best bearing estimates. Mathematically, the likelihood function can be written as:

$$L = \sum_{t=1}^{M} |y(t) - Ds(t)|^2 \quad (1)$$

where
L=likelihood function
t=time
M=number of snapshots
y=observation vector (length=p)
s=signal vector (length=q)
D=steering matrix For a uniform linear array, the steering matrix has the following Vandermonde structure:

$$D = \begin{bmatrix} 1 & 1 & \ldots & 1 \\ e^{ik_1} & e^{ik_2} & \ldots & e^{ik_q} \\ \cdot & \cdot & & \cdot \\ \cdot & \cdot & & \cdot \\ \cdot & \cdot & & \cdot \\ e^{i(p-1)k_1} & e^{i(p-1)k_2} & \ldots & e^{i(p-1)k_q} \end{bmatrix}$$

where
$K_i = \omega \tau(\theta_i)$
$\omega$=narrowband frequency
$\tau(\theta)$=time delay between elements Minimization of the likelihood function with respect to the signal vector, s, can be accomplished by setting the partial derivatives of L to zero. This yields the following relationship $$s(t) = (D^H D)^{-1} D^H y(t) \quad (2)$$

where H denotes the Hermitian transposition. Inserting this result into the likelihood equation yields $$L = \sum_{t=1}^{M} |[I - D(D^H D)^{-1} D^H] y(t)|^2 \quad (3)$$

Defining the projection operator $$p = I - D(D^H D)^{-1} D^H \quad (4)$$

yields $$L = \sum_{t=1}^{M} |Py(t)|^2 \quad (5)$$

Equation (5) may be rewritten as $$L = \mathrm{tr}[PR] \quad (6)$$

where R, from equation (6) is the sample covariance matrix $$R = \frac{1}{M} \sum_{t=1}^{M} y(t) y(t)^H \quad (7)$$

The representation of equation (6) is the textbook approach to the maximum likelihood method.

The maximum likelihood method can also be applied to spectral estimation problems. Mathematically, the equation differences include replacing the wavenumber, k, with the angular frequency variable, $\omega$. Likewise the spatially separated array data is replaced with time series data. This duality between the spatial domain and the time domain is seen in many areas of signal processing.

The utility of the maximum likelihood method has been limited because of its large computational load. The likelihood function evaluation has traditionally required that the complex matrix operations to be done numerically. The computational load of the matrix computations scale as the number of array elements squared. This quadratic increase in the processing load requirement tends to limit the usefulness of this approach.

The goal of the maximum likelihood method is, of course, to find the largest value of the likelihood function. This is a nonlinear multivariate problem. These searches can be difficult. An additional complication occurs when the number of sources is not known. This affects the number of variables and therefore the size of the steering matrix. The solution to this overall maximum likelihood problem is computationally difficult.

BRIEF SUMMARY OF THE INVENTION

The approach used in this invention is based on the traditional maximum likelihood method. However, instead of a straightforward numerical evaluation of the likelihood function, an analytical approach that exploits the symmetry in the equations is used to reduce the evaluation to a simple vector product. Additionally, an approximation to this new representation can be used to reduce the multivariate maximization problem to a simple one parameter search.

According to this invention, conventional beamforming methods can be replaced by this computationally efficient maximum likelihood approach. Spectral analysis methods, such as the fast Fourier transform, can also be replaced with this maximum likelihood approach. Advantages of the maximum likelihood method primarily include its high is resolution, unbiased estimates. A secondary benefit of this approach is a reduction in noise levels.

Therefore, it is an object of the present invention to provide for a computationally efficient implementation of the maximum likelihood method based on exploiting the symmetry in the equations to transform the likelihood function calculation from a matrix operation to a simple vector product operation.

It is another object of the present invention to provide for this new representation of the maximum likelihood method which allows a simple one parameter search for the likelihood function maxima.

These and other advantages and objects of the present invention will become apparent from the following detailed description read in conjunction with the drawings.

DETAILED DESCRIPTION

Figure 1:
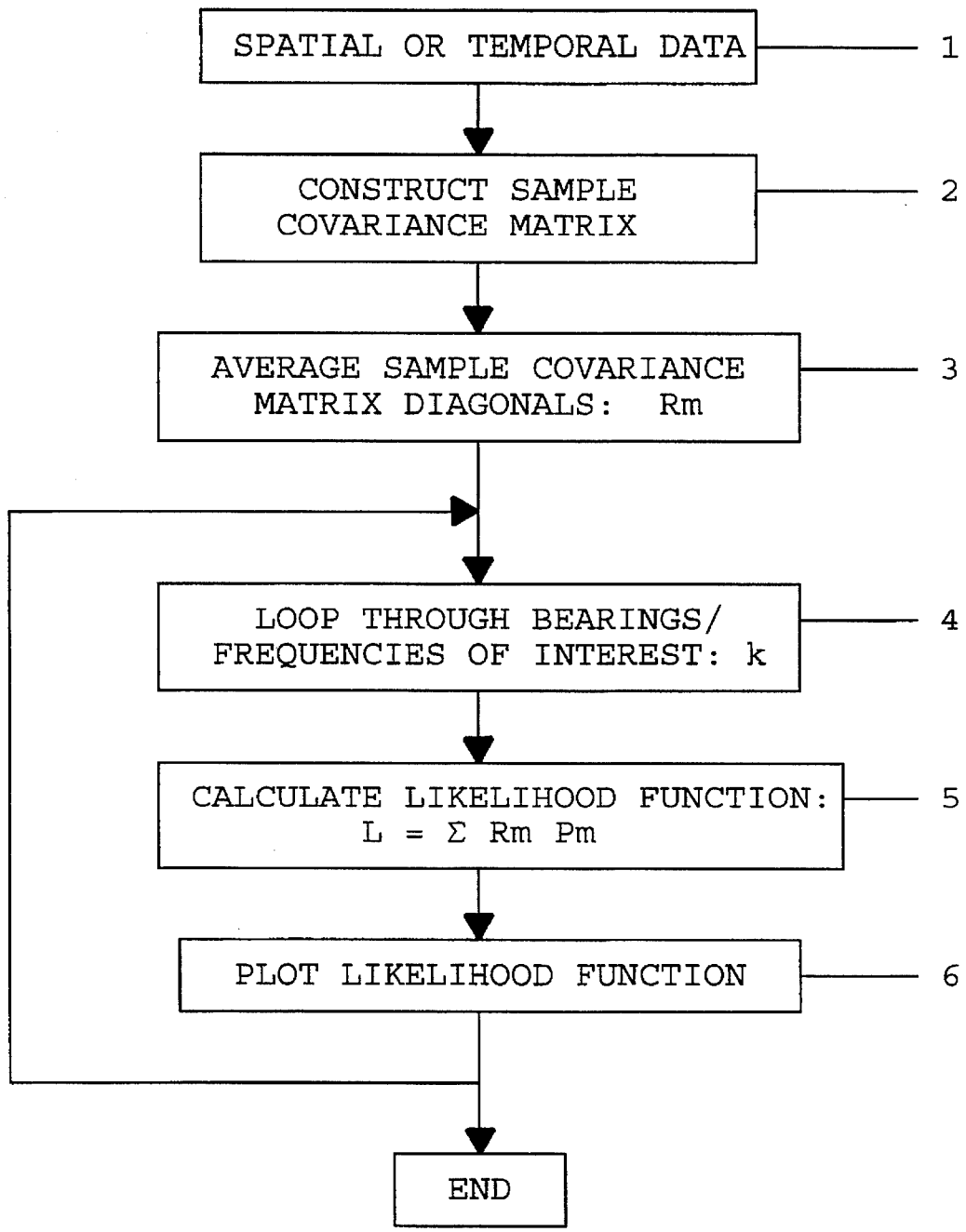
FIG. 1 is a block diagram which may be used to carry out the maximum likelihood function of the present invention.

The present invention provides for simplification of the likelihood function. The symmetry in the problem can be used to simplify the likelihood function. This symmetry can be seen in the uniform element spacing along a linear array. The symmetry is also seen in the uniform time sampling of time series data.

To start the analytic evaluation of the likelihood function it is convenient to define the following matrix elements:

$c_{mn}$ is the (m,n)th entry of the $D^H D$, $b_{mn}$ is the (m,n)th entry of the $(D^H D)^{-1}$ $a_{mn}$ is the (m,n)th entry of $D(D^H D)^{-1} D^H$.

The $c_{mn}$ terms are simply summations of finite geometric series:

$$c_{n_1 n_2} = 1 + e^{i(k_{n2}-k_{n1})} + \ldots + e^{i(p-1)(k_{n2}-k_{n1})} \quad (8)$$

$$c_{n_1 n_2} = \frac{1 - e^{-ip(k_{n2}-k_{n1})}}{1 - e^{-i(k_{n2}-k_{n1})}} \quad n_1 \neq n_2 \quad (9)$$

$$c_{n_1 n_2} = p \quad n_1 = n_2 \quad (10)$$

The projection terms can be written as:

$$a_{mn} = \sum_{n_2=1}^{q} \sum_{n_2=1}^{q} b_{n_2 n_1} e^{-i((n-1)\omega_{n2}-(m-1)\omega_{n2})} \quad (11)$$

It is useful to constrain the sample covariance matrix to be Toeplitz. This constraint exploits the translational symmetry of the array. In this picture all nearest neighbor elements have the same theoretical covariance. Likewise, all next nearest neighbors have the same covariance and so forth. Imposing this constraint simplifies the problem and should lead to better estimates since the data along the diagonals is averaged. This can be thought of as a filtering process that can eliminate a significant amount of noise. Many authors have investigated the advantages of using this constraint in various signal processing problems.

$$R = \begin{bmatrix} R_0 & R_1 & R_2 & \ldots & R_{p-1} \\ R_1 & R_0 & R_1 & \ldots & R_{p-2} \\ R_2 & R_1 & R_0 & \ldots & R_{p-3} \\ \cdot & \cdot & \cdot & & \cdot \\ \cdot & \cdot & \cdot & & \cdot \\ \cdot & \cdot & \cdot & & \cdot \\ R_{p-1} & R_{p-2} & R_{p-3} & \ldots & R_0 \end{bmatrix}$$

The maximum likelihood function can now be written as $$L = \sum_{m=1}^{p-1} R_m \sum_{n=1}^{p-m} (a_{n,n+m} + a_{n+m,n}) \quad (12)$$

where $R_m$, from equation (12) is the average value of the $m^{th}$ diagonal of the sample covariance matrix. The $R_0$ terms have been eliminated since they add no information to the problem.

This representation can be simplified by evaluating the following vector:

$$P_m \equiv \sum_{n=1}^{p-m} (a_{n,n+m} + a_{n+m,n}) \quad (13)$$

$$= \sum_{n_2=1}^{q} \sum_{n_1=1}^{q} b_{n_2 n_1} (e^{imk_{n2}} + \quad (14)$$

$$e^{-imk_{n1}}) \sum_{n=1}^{p-m} e^{-i(n-1)(k_{n1}-k_{n2})}$$

$$= \sum_{n=1}^{q} b_{nn} 2(p-m) \cos(mk_n) + \sum_{n_2=1}^{q} \sum_{n_1=1}^{q} b_{n_2 n_1} (e^{imk_{n2}} + \quad (15)$$

$$e^{-imk_{n1}}) \frac{1 - e^{-i(p-m)(k_{n1}-k_{n2})}}{1 - e^{-i(k_{n1}-k_{n2})}}$$

for $n_1 \neq n_2$

Since $c_{mn} = p$, and $c_{n_2 n_1}$ is typically small, (see equation (10)), a first order approximation yields $b_{nn} = p^{-1}$ and $b_{n_2 n_1} \sim p^{-2}$. Using these values yields a projection vector representation that has leading terms of approximately unity followed by a double summation of terms that scale as $p^{-2}$. For reasonable values of p, the $b_{n_2 n_1}$ terms can be neglected. The representation can now be approximated by:

$$P_m \approx \sum_{n=1}^{q} 2 \frac{p-m}{p} \cos(mk_n) \quad (16)$$

An important result of this approximation is that the multivariate problem is now decoupled. This allows the maximization search to be done in one variable instead of q simultaneous variables.

$$P_m \approx 2 \frac{p-m}{p} \cos(mk) \quad (17)$$

The simplest way to implement the maximum likelihood search is to simply scan across a range of values of the wave number, k. The maxima of the resulting beamformer spectrum correspond to the most likely estimate of the source bearings.

A flow chart of an example implementation is illustrated in FIG. 1. As seen in this figure, the initial step in computing a maximum likelihood function is to collect data samples in block 1 from a linear array of sensors or a time series. Once the data is collected, a sample covariance matrix is formed in block 2. The covariance matrix is then constrained to be Toeplitz by averaging the diagonal of the sample covariance. From averaging the diagonals of the sample covariance, a covariance vector, $R_M$, can be formed, as seen in block 3.

The next step to do is to establish a set of bearings or frequencies. As seen in block 4 the set of bearings or frequencies is arbitrarily labeled as k. From equations (12)–(17) it is shown that the maximum likelihood function can be written as $$L = \sum_{m=1}^{p-1} R_m \frac{2(p-m)}{p} \cos(mk) \quad (18)$$

Using equation (18), the maximum likelihood function is calculated in block 5. Once calculated, the result can be plotted as shown in block 6. This process of calculating the maximum likelihood and plotting is continued until there are no bearings or frequencies left to be tested.

Figure 2:
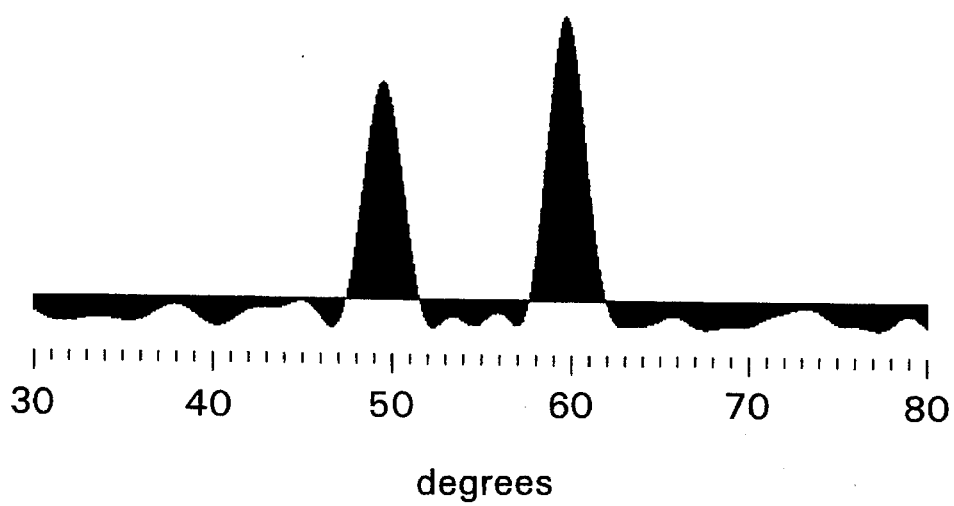
FIG. 2 is an example of the maximum likelihood function of the present invention used in bearing estimation.

An example of the maximum likelihood beamformer is illustrated in FIG. 2. This shows the likelihood function evaluated from 30 to 80 degrees in 0.2 degree increments. The simulated data is from a 50 element array with wavelengths over two spacings. A single snapshot is used to construct the sample covariance matrix for two sources, ona at 50 and 60 degrees. The signal to noise ratio (SNR) used is 0 dB (relative to the narrowband noise) for both sources. The figure clearly shows two unmistakable peaks at the source bearings (within 0.2 degrees). The noise is suppressed due to the smoothing effects of the Toeplitz constraint. This tends to increase the sensitivity for detection which is often a goal of the beamformer.

Figure 3:
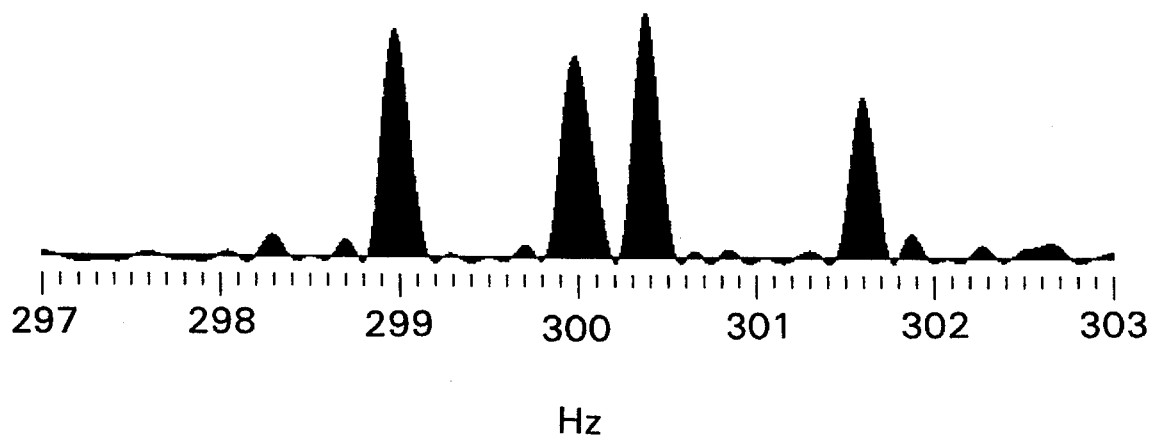
FIG. 3 is an example of the maximum likelihood function of the present invention used in spectral analysis.

A spectral analysis application is considered in FIG. 3. A five second data sample is simulated with 5000 data points from a unit amplitude signal at 299 Hz, 300 Hz, 300.4 Hz, and 301.6 Hz. Noise is represented by adding a random number between +10 and −10 to these signals. The covariance vector is calculated and the approximate projection vector is used to evaluate the likelihood function for frequencies from 297 Hz to 303 Hz in 0.01 Hz increments. Four peaks in the likelihood function are clearly seen. The maxima are all within 0.02 Hz of the source signals.

At radio frequencies it may be impractical to calculate the sample covariance vector at a rate that is sufficiently fast. This situation cam still use the maximum likelihood method by evaluating the covariance vector directly in hardware. The covariance vector for this continuous time case may be written as:

$$R_m = \frac{1}{\tau} \int_0^\tau y(t)y(t + m\Delta)dt \quad (19)$$

Implementation of this equation requires delaying the signal by multiples of the time interval, $\Delta$. The signal and the delayed signal are then multiplied and integrated. This circuit is effectively a phase comparator. The resulting covariance vector is multiplied by the (approximate) projection vector to evaluate the likelihood function.

The likelihood function evaluation typically works very well using the approximate projection vector. This approximation, where the $p^{-2}$ terms are neglected, can also be thought of as the exact solution to the one source case. In situations where it is necessary to resolve two very close sources, the two source approximation method should be used. This involves a more complex projection vector $$p_m = 2\cos(mk_1) + 2\cos(mk_2) - \quad (20)$$
$$2m \frac{p(1-\cos(k))}{p^2(1-\cos(k)) - (1-\cos(pk))}(\cos(mk_1) + \cos(mk_2)) -$$
$$2 \frac{\sin(pk)}{p^2(1-\cos(k)) - (1-\cos(pk))}(\sin(mk_1) - \sin(mk_2))$$

where $k=k_1-k_2$

Evaluation of the likelihood function now involves two parameters ($k_1, K_2$). This introduces additional complexity into the maximization search. However, some special situations may require the higher resolution.

A maximum likelihood beamformer can be constructed from a two dimensional array of elements. These arrays are important when both altitude and bearing estimates are needed. The two angle estimates can be constructed by considering the array to be subdivided into multiple horizontal linear arrays and multiple vertical linear arrays. Translational symmetry says that all the nearest neighbor covariances, next nearest neighbor covariances, etc., along any particular axis can be averaged.

Therefore, the covariance vectors for both the horizontal and vertical components can be easily calculated yielding two maximum likelihood beamformer spectra from which altitude and bearing estimates can be derived. Multiple target ambiguities or higher resolution may require additional multiple diagonal linear arrays to be simultaneously considered.

Thus far, the construction and evaluation of the likelihood function as well as some application examples have been disclosed. The maximization search for the best estimates has so far been limited to a simple evaluation of the likelihood function across a range of values. It should be noted that searches based on the derivatives of the likelihood function are more efficient at finding maxima. Maximization searches are an important part of applied mathematics and these techniques can be used for this problem.

While the invention has been particularly shown and described with reference to an embodiment thereof, it will be understood by those skilled in the art that various changes in form and detail may be made without departing from the spirit and scope of the invention.

I claim:

1. A method of determining bearing estimation parameters from a uniform array of sensors, said method comprising:

(a) sampling and digitizing outputs from said uniform array of sensors;

(b) forming a sample covariance matrix from said outputs of said uniform array of sensors;

(c) averaging diagonals of said sample covariance matrix for obtaining a sample covariance vector ($R_m$);

(d) providing a projection vector ($P_m$) where $$p_m = 2\cos(mk_1) + 2\cos(mk_2) -$$
$$2m \frac{p(1-\cos(k))}{p^2(1-\cos(k)) - (1-\cos(pk))}(\cos mk_1 + \cos mk_2) -$$
$$2 \frac{\sin(pk)}{p^2(1-\cos(k)) - (1-\cos(pk))}(\sin(mk_1) - \sin(mk_2)),$$

for $K_1$ to be a wavenumber for a first source, $k_2$ to be a second wavenumber for a second source and $k=k_1-k_2$;

(e) computing a likelihood function (L) by multiplying said sample covariance vector with said projection vector;

(f) solving a maxima of said likelihood function with respect to said wavenumber and said second wavenumber; and (g) resulting said wavenumber and said second wavenumber at said maxima for providing a best estimate of bearings.

2. A method of determining frequency estimation parameters, said method comprising:

(a) forming a time series vector by sampling and digitizing outputs from a sensor;

(b) forming a sample covariance matrix from said outputs of said time series vector;

(c) averaging diagonals of said sample covariance matrix for obtaining a sample covariance vector ($R_m$);

(d) providing a projection vector ($P_m$) where $$p_m = 2\cos(mk_1) + 2\cos(mk_2) -$$
$$2m \frac{p(1-\cos(k))}{p^2(1-\cos(k)) - (1-\cos(pk))}(\cos mk_1 + \cos mk_2) -$$
$$2 \frac{\sin(pk)}{p^2(1-\cos(k)) - (1-\cos(pk))}(\sin(mk_1) - \sin(mk_2)),$$

for $k_1$ to be a digital frequency for a first source, $k_2$ to be a second digital frequency for a second source and $k=k_1-k_2$;

(e) computing a likelihood function (L) by multiplying said sample covariance vector with said projection vector;

(f) solving a maxima of said likelihood function with respect to said wavenumber and said second wavenumber; and (g) resulting said wavenumber and said second wavenumber at said maxima for providing a best estimate of frequencies.

3. A method as in claim 2 wherein said sample covariance vector ($R_m$) is constructed from an autocorrelation function of said sensor sampled at a number of discrete time lags.

* * * * *